(No Model.)

E. J. B. WHITAKER.
AUTOMATIC FEED GEAR FOR ANIMALS.

No. 288,143. Patented Nov. 6, 1883.

Witnesses:
A. W. Steiger
O. H. Rowe

Inventor:
Elijah J. B. Whitaker
By David A. Burr
Attorney.

UNITED STATES PATENT OFFICE.

ELIJAH J. B. WHITAKER, OF NEW YORK, N. Y.

AUTOMATIC FEED-GEAR FOR ANIMALS.

SPECIFICATION forming part of Letters Patent No. 288,143, dated November 6, 1883.

Application filed August 29, 1883. (No model.)

*To all whom it may concern:*

Be it known that I, ELIJAH J. B. WHITAKER, of the city, county, and State of New York, have invented a new and useful Improvement in Automatic Feeding-Bridles; and I do hereby declare that the following is a full and exact description thereof, reference being had to the accompanying drawings, and to the letters of reference marked thereon, making a part of this specification.

My invention relates to an improvement in the feed bridle or device for the suspension of a bag from a horse's head as a feed-receptacle.

It consists, mainly, in suspending the bag directly from the head-strap and brow-band by means of cheek straps or cords on either side, to which the nose-band is secured, and in combining therewith a cord or bridle secured to the feed-bag at or near the points of its attachment to the cheek straps or cords, and which is led up on either side, parallel therewith, over pulleys secured at the juncture of the brow and head bands, and thence formed into a loop adapted to be carried back and caught upon the check-hook or the harness, the object of my improvement being to combine with the permanent suspension of the nose-bag from the headstall a device which shall, without interfering with the free movement of the horse's nose into the bag to reach the bottom thereof, prevent the bag from tilting away from the horse's nose when his head is lifted or turned aside, and guide and facilitate its descent into the bag for feeding.

Figure 1:
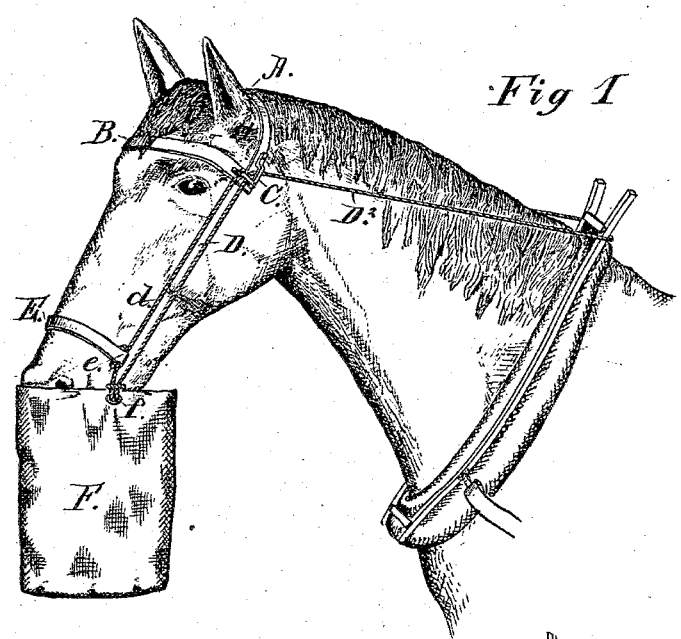
Figure 2:
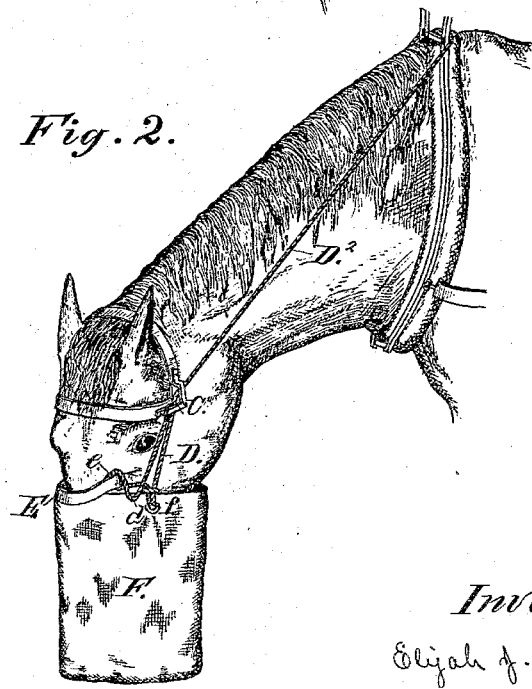

In the accompanying drawings, Figure 1 is a view of the feed-bag suspended upon a horse's head, the head being in an erect position, as when the animal is eating; and Fig. 2, a view of the same, showing the horse's head depressed, as in the act of reaching for food.

The head-strap and brow-band of my improved feeding-bridle are secured together by any suitable means in the customary form for a head-gear, but preferably by means of two double metallic angle plates or brackets, C, one of either side, riveted to the strap and band to unite and confine them, each bracket being fitted with a pulley through which to lead the feed-cord.

The feed-bag is suspended from the brackets C C, or from the intersecting points of the brow and head bands, by means of cords or straps $d$ $d$, which are securely tied or attached to the brackets or head-gear at one end, and, extending thence downward in the form of cheek-straps, are also securely attached to the upper end of the feed-bag at the other, these suspension or cheek straps being so adjusted in length as that when the gear is placed upon the horse's head the bag will drop just below his nose, and allow it to be fully uncovered. (See Fig. 1.)

To prevent the horse from throwing his nose forward entirely clear of the bag, and to maintain such a proper relation as will facilitate the ready insertion of the nose into the bag for feeding, a nose-band, E, is attached to the cheek-straps $d$, so as to bind closely over the horse's nose, when, his head being lifted, these suspension or cheek straps are made taut by reason of the tension thereon of the bag and its contents.

To prevent the bag from dropping when the horse lowers his head to obtain feed therefrom, two ends of a cord, D, are attached to the edge of the feed-bag at the juncture therewith of each of its suspension-straps $d$, and this cord is led up parallel with said straps on each side and over the pulleys in the brackets C, and thence left loose in a loop, $D^2$, of sufficient length to engage the check-hook or hames on the harness, and at the same time leave the bag free to hang below the horse's nose when the head is lifted. When the feed cord or bridle D $D^2$ is thus made fast upon the check-hook, if the horse lowers his head the check or suspension straps $d$ $d$, and the nose-band attached thereto, are so slackened and loosened thereby as to leave the horse's nose entirely free and unrestrained in entering the bag, while the bag remains meanwhile upheld and suspended by and upon the bridle-cord D.

Instead of employing separate cords or straps for the suspension of the bag from the headstall and from the check-hook, I prefer to use a single cord, which, being looped to be drawn over the check-hooks or hames of the harness, is led over the pulleys on either side of the head-gear, and thence down on each side to the eyelets $f$ in the feed-bag. Its two ends are then led through the two eyelets, being made to pass double through each eyelet in a mooring-knot, which will firmly secure the cord, and yet permit of its adjustment when loosened. Each end of the cord is then passed up from each eyelet f through the loop or eye e in one end of the nose-band E with a double turn, which permits an adjustment of the band when the turn is loosened, but will otherwise hold it fast, and is firmly secured to the pulley-bracket at the juncture of the head and brow bands. The nose-strap E holds the bag in place and prevents it from being upset or tilted sufficiently to spill the feed from the bag. When the bag is raised, it will be seen, as shown in Fig. 2, that the nose-strap E will be loosened sufficiently to drop outside of the bag and out of the way of the horse's head, so that the bag can be completely extended and drawn up over and closely around his head.

The nose-band may be formed of a forked strap extending from a single central point on the brow-band of the headstall to the two suspension-straps, although I deem the straight nose-band E shown in the drawings to be preferable.

I do not broadly claim a feed-bag supported by a cord or rein which is led over pulleys on the headstall of the halter, and is secured to the harness for upholding the bag when the horse's head is lowered into it.

I claim as my invention—

1. The combination, in an automatic feeding-gear for horses, with a feed-bag, a headstall, and a running tension-cord led from the bag on either side through guides or pulleys on the headstall to a point of attachment on the harness, of cords or straps fixed to the bag at one end and to the headstall at the other, to limit the fall of the bag when freed from the tension of the running cord, substantially in the manner and for the purpose herein set forth.

2. The combination, in an automatic feeding-gear for horses, with a feed-bag, a headstall, suspension cords or straps fixed on either side to the bag at one end and to the headstall at the other, and with a running tension-cord led from the bag on either side through guides or pulleys on the headstall to a point of attachment on the harness, of a nose-band secured at either end to the fixed suspension cords or straps, to bind upon the horse's nose when the tension-cord is loose and free, and to fall loosely away therefrom when the bag is upheld by the tension-cord, substantially in the manner and for the purpose herein set forth.

In testimony whereof I have signed my name to this specification in the presence of two subscribing witnesses.

E. J. B. WHITAKER.

Witnesses:
A. W. PTEIGER,
J. F. ACKER, Jr.